May 12, 1964   J. E. JOHNSON ETAL   3,132,415
METHOD OF REPLACING CONDUCTORS IN A FLEXIBLE PLASTIC CONDUIT
Original Filed July 5, 1962

INVENTORS
JOHN E. JOHNSON
LELAND O. CROPPER
BY
Darby + Darby
ATTORNEYS

United States Patent Office 3,132,415
Patented May 12, 1964

3,132,415
METHOD OF REPLACING CONDUCTORS IN A FLEXIBLE PLASTIC CONDUIT
John E. Johnson, 900 Sansom St., Philadelphia 5, Pa., and Leland D. Cropper, 13 Holbrook Road, Havertown, Pa.
Original application July 5, 1962, Ser. No. 207,749. Divided and this application May 3, 1963, Ser. No. 277,908
5 Claims. (Cl. 29—401)

This invention comprises a method of facilitating the replacement of conductors in a flexible plastic cable conduit which has been deformed.

The main object of the invention is to provide a novel method of replacing one or more of the conductors in a flexible insulating tubular housing which has become deformed at one or more points or regions over a portion of its length due to loading thereon, so as to restore it substantially to original shape by the application of internal fluid pressure without overstressing the conduit.

A more specific object of this invention is to provide a method of this kind for use on a duct assembly which is buried in the ground and is deformed by loading thereon as a result, in part at least, of such burial.

Other and more detailed objects of the invention will be apparent from the following disclosure.

This application is a division of our copending application Serial No. 207,749, filed July 5, 1962, for Unitary Underground Conduit and Cable System, now abandoned.

As those skilled in this art will understand, it is almost universally true that underground conductors are installed in sectionalized duct systems. These duct systems take a number of different forms, including present systems now most used and even lengths of threaded pipe which are coupled together manually by suitable fittings of a form to meet changes in route and profile. After these duct systems are installed in the ground it is necessary to pull through them, by means of a fishing wire, the conductors of the system. It is obvious that the transfer, the handling and installation of these old type systems under present high labor costs suggests the desirability of a simpler but as effective an installation. Contributing to these costs are the necessity of digging wide enough trenches in which the ducts are laid so that the workmen can couple the duct sections together and perform other required operations. Likewise, with such systems either buried splice boxes or buried splices are customarily included, further contributing to the expense and difficulty of installation.

The general object of this invention is to provide a sufficiently flexible, so as to be coilable and so as to be readily formable by hand into bends of various radii as short as five times the outside diameter, if necessary, and sufficiently resilient so as to restore deformations incident to installation, unitary product consisting of a moisture proof, imperforate, strong, tough resilient, flexible plastic tube containing the conductor or conductor cables already installed. With this arrangement only a shallow open trench is required in which the assembly can be quickly laid and then the trench backfilled. The product of this invention is supplied to the job in the form of coils or on spools and can be readily fed into the trench, as for example from the back of a truck, moving therealong or straddling the trench. Preferably the product units extend from utility to utility, as for example from lighting pole to lighting pole, in single continuous unbroken lengths. The connections can be made to the lighting circuit, for example, above ground, the trench having already been completely backfilled. This assembly may be installed in extremely long lengths unlimited by the present maximum pulling lengths of present drawn-in systems. Also splices may be made readily in the conductors and duct of the system.

The conductors in the duct fit loosely therein with ample excess space so that additional conductors can be pulled through when required, or old ones replaced for purposes of maintenance. The looseness of the fit should be such that the area of the cross section of the conductors and their insulation is not more than about sixty percent of the cross section of the duct bore.

Those skilled in the art will appreciate that there are many other advantages of a system of this type.

Figure 1:
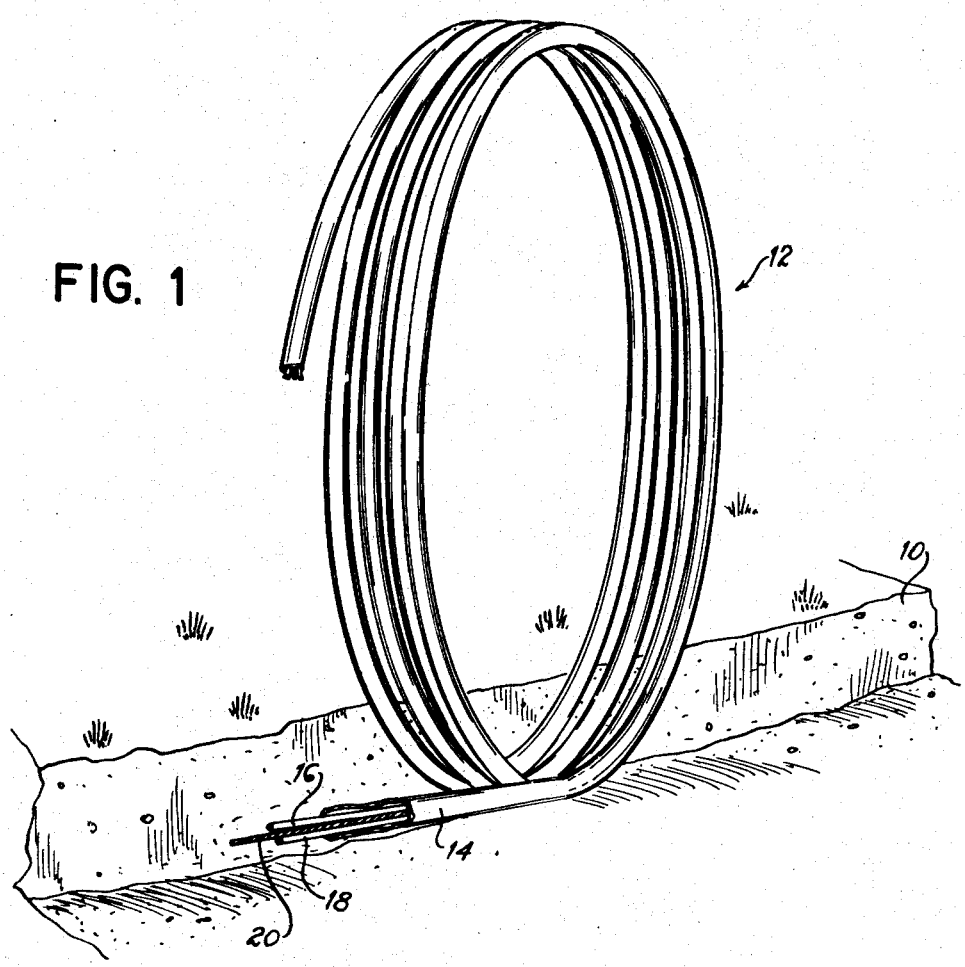
FIGURE 1 is a fragmentary perspective view of the duct and cable assembly of this invention, diagrammatically illustrating the manner of installation in an open trench.

As illustrated in FIGURE 1, the unit is provided in this case in the form of a coil 12, which can be rolled along the shallow open trench 10, for example, to lay the unit therein. Similarly it could be provided on a large spool which could be rolled along the ground or paid off from a truck. Also the unit is capable of being plowed into the ground as is done conventionally with direct buried cable.

As illustrated, the unit consists of a plastic tube 14, which by way of example in the case of street lighting, can have an external diameter of 1.462" and an internal diameter of 1.25", providing a wall thickness of about 0.106".

Within the duct 14 and coextensive in length therewith are illustrated a plurality of conductors 16, 18 and 20 in the case for example of a three wire street lighting system. As illustrated the conductors 16 and 18 are individually insulated while the conductor 20 is bare, the wire parts thereof being straightened. As is clear from FIGURE 1, the total overall diameter of the conductors is substantially less than the internal diameter of the duct 14, so that the individual conductors can be withdrawn and replaced by additional conductors drawn into the buried tube.

For example, for the tube with 1.462" outside diameter, the insulated conductors 16 and 18 could conventionally be of No. 6, American Wire Gauge, having an outside diameter of 0.31" and the bare conductor 20 might be of No. 6, AWG, having an outside diameter of 0.184", the conductors thus occupying approximately 15 percent of the cross sectional area of the bore of the duct 14. The largest size of the two insulated conductors with a 600 volt rating which would normally be used for a three-wire installation as illustrated with 1.25" duct bore would be approximately No. 0 AWG. The bare conductor would also be No. 0 AWG and the cross sectional area of these three conductors would be about 55 percent of the cross sectional area of the duct bore.

It is also to be understood to be within the scope of this invention to provide the conductors in the form of a unitary cable which can be withdrawn or augmented, as conditions require.

The plastic tubing 14 can be made, depending upon installation requirements and the element of cost, of various plastic materials. The term plastic as used here being intended to include all suitable polymers having the requisite characteristics of flexibility, strength, toughness and resilience. Suitable plastics for this purpose include styrene and copolymers thereof, acrylics, polyamides, linear or branched polyethylene, both thermoplastic and cross-linked, vinylidene chloride, polypropylene, nitrile rubbers, polyurethane and vinyls. In one presently available commercial form the duct is made of a polyethylene base, comprising a composition which is easily extrudible into continuous tubular form. It is believed to be unnecessary to specify in detail the various compositions, including those plastic resins which are suitable to the purpose because this knowledge is widely held in the plastic extruding art.

The materials of the duct 14 instead of having the good electrical insulating qualities characteristic of the plastics previously described, may alternatively be semi-conducting plastic materials such as the conventional semi-conducting polyethylene materials marketed by Union Carbide Plastics Company under catalog designations "Bakelite DFDA0520," "Bakelite DFDC5275," and "Bakelite DHDA7800," which have resistances of 1, 5 and 40 ohm-centimeters, respectively, at 23° C. The advantages of using this semi-conducting duct are that it will function as a ground shield to protect a workman from electric shock should he inadvertently drive a metal tool through the duct into contact with a live conductor, and will protect the cables from excessive voltage in case of a nearby lightning stroke.

Within the purpose of this invention the extrudible compositions, of which there is a very wide range, must have the characteristic of being mechanically strong enough for the purpose, resistant to deterioration when buried and the deteriorating effects of weather and electric current. The tube as suggested by the above figure should have a sufficiently strong form sustaining ability so as to withstand the loading and backfilling and the operation normally tied thereto. Since the shallow trenches may often be exposed to loading, such as trucks driving over them, the duct must be sufficiently flexible to suffer some deformation under loading without collapsing, and have the ability of returning substantially to the normal cross section when the load is removed. The example given above has been widely tested and is capable of withstanding very high loading even in shallow trenches.

To determine the practical ability of the duct and cable assembly, transverse compression tests were made on the duct alone and also on the assembly with conductors in place. Four of the ducts without conductors therein were buried in single lengths of 150' at depths of 6", 12", and 18" in cinder fill without tamping. The ducts were made of high molecular weight (melt index 1.50 max.), high impact resistant (0.9 ft. lb. per in. ASTM D-256), black polyethylene. The number and dimensions of the ducts were as follows:

| Number of ducts | Inside diameter | Wall thickness |
|---|---|---|
| 3 | 1" | 0.091" |
| 1 | 1.25" | 0.106" |

The ducts were allowed to "snake" back and forth in the trench but were not permitted to cross each other. The ducts were bent upward at the ends and brought above ground through the bases of hollow metal street light poles. A mandrel 0.25" smaller in diameter than the respective duct bore was pulled through each duct to determine the degree of restriction introduced by this random snaking and the bends at the ends. The maximum pulling tension was found to be ten pounds.

Three No. 6 AWG stranded wires insulated with 4/64" of semi-rigid heat and moisture resisting polyvinyl chloride compound were provided in each of two of the one inch ducts (designated X and Y, respectively) and the third (designated Z) was filled with water to within a few inches of the ends. Several feet of excess wire were left extending from the ends of ducts X and Y. The wires as a group in each duct were pulled back and forth a few feet in the ducts to determine the degree of restriction of their movement. The maximum force required to accomplish this movement of the group of wires was 80 pounds.

A 14 ton truck was driven slowly transversely over the trench at the portions where the ducts were buried 6", 12", and 18" deep, respectively. Each time the truck wheels were over duct Z the water level rose 1" in the vertical portion at the ends. As soon as the wheels moved off the duct the water returned to the original level.

During a ten day period the trench was crossed 224 times by 14 ton trucks as follows:

| Depth of burial: | Times trench was crossed |
|---|---|
| 18" | 32 |
| 12" | 112 |
| 6" | 80 |

A 14 ton truck was then parked with the rear wheels on the section buried 6" deep for 16 hours after which tests were again made to determine degree of restriction of movement. The maximum force required to move the cables back and forth for a few feet in the ducts was found to be unchanged at 80 pounds even with the truck still in place.

Ducts X and Y were subsequently filled with water and the insulation resistance of the cables in them was measured with 1000 volts impressed between the conductors and the water and found to be above 1000 megohms, indicating that at no time during the test was there any substantial damage to the cable insulation.

The wires were removed from ducts X and Y and mandrels were pulled through the ducts. The small forces (of the order of 10 pounds) required indicated that there were no restrictions in any of the ducts.

In order to determine the facility of removal and replacement of the wiring in our assembly, the three wires as a group was removed from ducts X and Y and one group was pulled into duct Z. The maximum force required to withdraw the wires and pull them into duct Z was found to be not in excess of 80 pounds. The maximum force required to pull the same size conductors in the 1.25" duct in the same trench and subjected to the same loading was found to be only 40 pounds. The pulling was done through the bases of the street light poles with ease.

Standard splices were made in the hollow bases of the poles in which these duct assemblies terminated with much greater convenience than could have been made in the trench or underground splice boxes.

In another test to determine the effect of bending at different radii and different temperatures, pieces of the 1¼" duct and cable assembly having three #6 AWG conductors as described above were bent 90 degrees around cylindrical forms of various diameters. The assembly was secured to a point on the circumference of the forms so that it extended in a line tangent to the form at this point. The bending force tending to wrap the assembly about the form was applied substantially perpendicularly to the assembly at such distance from the above point of attachment as to be spaced 12" from the point of final tangency when the assembly was wrapped the full 90 degress around the form. The following table gives the temperatures and the corresponding forces required to bend the assembly 90 degrees around the diameter listed:

| Temperature, °F. | Bending radius, in. | Force in in lb. | Condition of assembly |
|---|---|---|---|
| 86 | 24 | 6 | Unaffected. |
| 84 | 5 | 22 | Duct and cables free. |
| 32 | 24 | 9 | Unaffected. |
| 23 | 24 | 10 | Do. |
| 0 | 12 | 42 | Duct and cables still free. |
| 0 | 5 | 37 | Duct buckled cables pinched. |

This test shows that the duct and cable assembly can satisfactorily withstand the deformation incident to installation even in zero degree Fahrenheit weather at bending radii down to the order of eight times the outside diameter of the duct (1.462"). Under a severe test a polyethylene duct and cable assembly of the dimensions herein disclosed was laid on a concrete floor and run over with a 14 ton transmission line truck three times. The duct flattened on the internal cables but on removal of the load always returned substantially to its original shape very quickly. The cables were removed with ease and found undamaged. The importance of this characteristic is that in use the duct should retain its original form sufficiently so as not to interfere with the replacement of installed conductors or the addition of other conductors when conditions require it.

In another test to determine the ability of one of our assemblies to withstand short circuit currents without softening until the circuit could be disconnected by the operation of a circuit breaker or by blowing a fuse, a fifteen foot length was supported on wooden blocks three feet apart. The inside diameter of the duct was 0.824" and it enclosed two #6 AWG stranded copper conductors each insulated with 5/64" of heat and moisture resistant polyvinyl chloride compound. A thermocouple was placed on one conductor about 7' from one end to measure the temperature at this point. An alternating current of 200 amperes R.M.S. was circulated from a current transformer cut through one conductor and back through the other.

The temperature of the conductor increased steadily from 25° C. to 175° C. during a period of 7.6 minutes when the conductors short circuited together indicating failure by softening of the insulation. The duct was still strong and resilient, and had retained its original shape. After the assembly had cooled to 35° C. the conductors were withdrawn with ease. Only negligible adherence of the P.V.C. insulation to the duct had occurred at the contact points. The short circuit had occurred near the end connected to the current transformer where the weight of the connecting cables had exerted a force on the conductors tending to push them together. At no other point was the insulation or duct deformed. This indicates that the assembly will resist the effect of short circuit currents of a magnitude larger than would normally be encountered in service for a far greater length of time than is required to cause a circuit breaker to open or a fuse to blow.

To complete the example disclosed which was designed for street lighting systems, the three conductors consisted of three No. 6 copper wires, two insulated with polyvinyl chloride and the other left bare. The overall diameter of this assembly in a duct of 1¼" size makes it possible to install additional or larger cables later by drawing them through.

Figure 2:
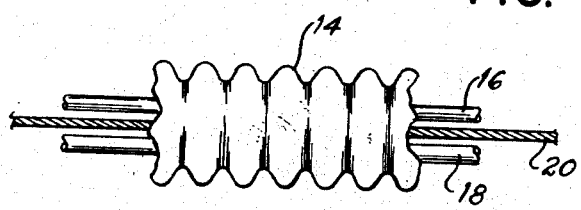
FIGURE 2 is an elevational view of a similar assembly having a corrugated duct.

FIGURE 2 shows a modification of our invention in which the duct 14' is formed with corrugations which may be helical like a thread or parallel as shown. The corrugations facilitate transverse bending, particularly in the case of thick duct walls, very stiff duct material, or large diameters. The corrugated duct has the additional advantage that, since there is room inside it for the cables to take a position such as irregular helix or the cables may be loosely twisted together, an excess length of cable can be provided so that the modified assembly can be installed conveniently where excessive earth movement or severe temperature changes are expected. For example, the modified duct and cable assembly could be installed under or over a bridge and thus be subjected to seasonal and diurnal temperature changes. The corrugated duct and cable assembly would readily elongate and contract with temperature changes without bowing out between supports or buckling at supports. In addition the modified assembly would elongate or shorten as the bridge members moved from expansion or contraction without harm to the assembly.

In view of the above disclosure it will be apparent to those skilled in the art that the objects of this invention are effectively obtained. It will also be apparent that various details of the construction selected for illustrative purposes can be widely varied within the objects and scope of this invention, and it is intended, therefore, that the example be considered solely for that purpose and that the protection afforded hereby be determined by the appended claims.

What is claimed is:

1. The method of removing a conductor from an assembly comprising a duct of strong, tough, resilient and flexible plastic material having enclosed therein at least one coextensive flexible conductor with a conductor cross-sectional area not in excess of about 60 percent of the initial cross-sectional area of the duct bore, said assembly having a substantial portion thereof buried in the earth and said duct being deformed from an initial external convex curved wall shape by soil pressure to such an extent as to bind on said conductor and prevent its withdrawal without applying excessive tension thereto, which comprises temporarily sealing said duct at one end against internal fluid pressure and applying fluid pressure into said duct at the other end until the cross-sectional area of the bore of the deformed duct has been increased to the extent necessary to permit movement of said conductor without undue tension thereon, relieving said fluid pressure and removing said end seal, and then withdrawing said conductor.

2. The invention of claim 1 in which after removal of said conductor a replacement conductor of larger cross-sectional area is drawn into said duct, and the cross-sectional area of the bore of the deformed duct has been increased to the extent necessary to permit said replacement conductor to be pulled into said duct without undue tension thereon.

3. The invention of claim 1 in which said assembly includes a plurality of conductors in said duct, said conductors having a combined cross-sectional area not in excess of about 60 percent of the initial cross-sectional area of the duct bore, and a plurality of conductors is withdrawn.

4. The invention of claim 3 in which after removal of said plurality of conductors, a plurality of replacement conductors having a combined cross-sectional area larger than that of the removed conductors is drawn into said duct and the cross-sectional area of the bore of the deformed duct has ben increased to the extent necessary to permit said plurality of replacement conductors to be pulled into said duct without undue tension thereon.

5. The invention of claim 4 in which said replacement conductors are combined into a multiconductor cable.

References Cited in the file of this patent

UNITED STATES PATENTS

| | | |
|---|---|---|
| 1,619,362 | Murray | Mar. 1, 1927 |
| 2,377,153 | Hunter et al. | May 29, 1945 |
| 2,980,474 | Gargan | Apr. 18, 1961 |

FOREIGN PATENTS

| | | |
|---|---|---|
| 572,339 | Great Britain | Oct. 3, 1945 |